Patented Feb. 2, 1960

2,923,673

PREPARATION OF PHOTOPOLYMERIZABLE COMPOUNDS

Stanley Hiram Munger, Rumson, N.J., assignor to E. I. du Pont de Nemours and Company, Wilmington, Del., a corporation of Delaware No Drawing. Application May 21, 1958
Serial No. 736,661

14 Claims. (Cl. 204—158)

This invention relates to photopolymerizable compositions and to their preparation. More particularly, it relates to such compositions which contain a substantial amount of a cellulose ester and to their preparation. Still more particularly, it relates to a process for preparing such compositions wherein the cellulose ester is formed during the preparation of the composition.

In Plambeck U.S. Patent 2,760,863 there are disclosed various processes for making photopolymerizable compositions and elements for the preparation of relief printing plates. These compositions utilize preformed polymeric materials which are compatible with the ethylenically unsaturated compound and addition polymerization initiator. Due to the variations in the polymeric material from batch to batch the resulting photopolymerizable compositions and elements vary also.

An object of this invention is to provide a simple process for making photopolymerizable compositions which are soluble in organic solvents or aqueous basic solutions. Another object is to provide such a process which eliminates the separate preparation and isolation of the cellulose derivative. Yet another object is to provide such a process which results in a uniform composition which yields photopolymerizable layers. A further object is to provide improved photopolymerizable layers and elements.

It has been found that photopolymerizable compositions having uniform properties which can be readily cast, pressed, or extruded to form photopolymerizable layers can be made by admixing a cellulose derivative containing free and esterifiable hydroxyl groups taken from the class consisting of cellulose partial esters of saturated aliphatic monocarboxylic acids of 2 to 4 carbon atoms, a dicarboxylic acid anhydride, an addition-polymerizable ethylenically unsaturated compound, an esterification catalyst preferably a tertiary amine esterification catalyst, and an addition polymerization initiator activatable by actinic light and having no significant thermal activity at temperatures utilized in the esterification, and heating the admixture at a reaction temperature from 85° C. to 180° C. while maintaining it under such a temperature for a period of about 0.5 to 60 minutes. The preferred initiators are thermally inactive below 185° C. In general, the ethylenically unsaturated compound is present in an amount of 10 to 60 percent by weight based on the final product.

The resulting composition can be used to make photopolymerizable sheets and elements of the types described in the above Plambeck patent. These elements may have a metal, e.g., steel or aluminum, resin or polymer base support.

In the preferred aspect of the invention, an amount of water, which can range from ½ to 10 times the weight of the cellulose derivative, but preferably equal to the weight of the cellulose derivative, is added at the time the cellulose derivative is admixed with the ethylenically unsaturated compound. The water must be removed as completely as possible, however, by drying the mixture prior to the addition of anhydride to prevent conversion of anhydride to the corresponding acid. The presence of initial water is advantageous despite the fact that it must be removed later, because it permits greater homogeneity of the mixture and prevents the occurrence of white specks which affect the optical clarity of layers made from the final reaction mixture and coating compositions made therefrom.

In a practical manner of carrying out the invention, a quantity of a cellulose ester is mixed for about 5 minutes preferably in a planetary mixer with the desired amount of the dicarboxylic acid anhydride, the addition polymerizable ethylenically unsaturated monomer, the esterification catalyst, the addition polymerization initiator and other desired adjuvants, e.g., addition polymerization inhibitor, organic and inorganic filler and the mixture is then milled in a plastics mill, e.g., a rubber mill, at a reaction temperature from 100° C. to 160° C. or more for about 10 to 30 minutes.

In a preferred manner of carrying out the invention (1) a cellulose ester, e.g., cellulose acetate is used and is mixed with (2) an addition polymerizable ethylenically unsaturated monomer capable of forming a high polymer rapidly by photoinitiated addition polymerization in the presence of the previously described addition polymerization initiator therefor activatable by actinic light (3) an addition polymerization inhibitor, and (4) water to act as a swelling agent in a suitable mixing apparatus, e.g., a planetary mixer. The mixture is then placed on a rubber mill or in a sigma blade mixer, e.g., a Werner-Pfleiderer or a Banbury mixer, smooth or corrugated, which is heated to at least 105° C., and the mixture is milled until the water is essentially evaporated from the mixture. At this stage, the mixture is a homogeneous plastic melt. A portion of (5) the dicarboxylic acid anhydride, e.g., succinic anhydride, is added to the mixture on the mill and is kneaded and uniformly distributed for about 5 to 10 minutes, during which time further drying takes place. Additional dicarboxylic acid anhydride is then added with a small quantity of (6) a tertiary amine esterification catalyst and the mixture milled for an additional 20 minutes. During the milling operation, the temperature is maintained between 105° C. and 160° C. The photopolymerizable composition is removed from the mill and is formed into a sheet by a pressing operation. The sheet, which is preferably between 3 and 250 mils in thickness, is then bonded to a suitable support, e.g., a steel or aluminum sheet or plate. This may be done after the manner described in Plambeck U.S. Patent 2,760,863 (see Example XVII) to provide a photopolymerizable element suitable for the preparation of printing reliefs by a process as described in said patent. In addition, it has been found that to the cellulose ester-ethylenically unsaturated monomer-initiator-inhibitor mixture, from which water has been essentially evaporated, there may be added the entire portion of the dicarboxylic acid anhydride in the absence of added esterification catalyst. After milling for about 5 minutes, the catalyst is added to the material on the mill and the milling continued for about 10 more minutes. Upon removal of the photopolymerizable composition, the latter can be used to make a photopolymerizable element as described above. Another useful method for preparing the photopolymerizable material is to charge the cellulose ester; ethylenically unsaturated monomer containing the initiator, inhibitor and stabilizer additives; water; and a portion of the photopolymerizable material to the rubber mill. The charge is milled to dryness. The entire portion of the dicarboxylic acid anhydride and catalyst is then added to the mixture on the mill and milled for about 10 minutes. The photopolymerizable composition after removal from the mill can be used to make a photopolymerizable element as described above.

Still another useful method for preparing the photopolymerizable material is to slurry a cellulose ester, an ethylenically unsaturated monomer containing only the thermal inhibitor, and an esterification catalyst with 10 to 12 or more parts of water (based on the weight of the cellulose derivative) for about 30 to 60 minutes. The impregnated cellulose ester is recovered by filtration and is dried until essentially all the moisture is removed. Photoinitiator, stabilizer, additional thermal inhibitor and the dicarboxylic acid anhydride are added to the essentially dried cellulose ester and the mixture milled for about 20 to 30 minutes at about 125 to 135° C. The photopolymerizable composition after removal from the mill can be used to make a photopolymerizable element as described above.

In general, the dicarboxylic acid anhydride will be used in an amount sufficient to introduce at least 0.2 acid ester groups per glucose unit in the cellulose chain in order to impart a satisfactory degree of solubility to the basic washout solution.

Monocarboxylic acid anhydrides can also be used. They are usually added in an amount sufficient to introduce at least 0.05 acid ester groups per glucose unit. The use of monocarboxylic acid anhydrides can result in mixed ester compositions which have improved physical properties, e.g., tensile properties and flexibility.

The acid cellulose esters made in photopolymerizable compositions in accordance with this invention should have an acid degree of substitution of from about 0.2 to 1.25, preferably in the range of 0.60 to 0.90, i.e., that many free carboxyl groups per glucose unit. Furthermore, the neutral degree of substitution should be in the range of from about 1.5 to 2.45, preferably about 1.85. By difference, therefore, the hydroxyl groups per glucose unit should lie between 0 and about 1.3, preferably 0.25 to 0.55.

In the preferred aspect of the invention cellulose acetate having a degree of acetyl substitution of approximately 1.85, i.e., the number of acetyl groups per glucose unit in the cellulose chain, and succinic anhydride are used to form cellulose acetate succinate.

The mixing and milling steps as well as any casting, extruding, pressing, coating or laminating operations should be carried out at temperatures and under conditions so that no significant thermal addition polymerization takes place. Also, these steps should be carried out in the absence of sufficient actinic radiation to effect addition polymerization.

The invention will be further illustrated by but is not intended to be limited to the following examples.

EXAMPLE I

Cellulose acetate (57 g., degree of acetyl substitution 1.85) was dried in a drying oven at 105° C. overnight. To the cellulose acetate in the 5-quart pot of a planetary mixer, the blades of which are operated by an electric motor, was added amounts of succinic anhydride, as indicated in Table 1. Forty grams of triethylene glycol diacrylate (containing 0.1% anthraquinone as a photoinitiator, 0.1% p-methoxy phenol as a polymerization inhibitor, and 0.1% mucochloric acid as a stabilizing agent) and 1 ml. diethylcyclohexylamine, as an esterification catalyst, was mixed for 5 minutes. The mixture was formed into a translucent sheet by milling on a two-roll rubber mill internally heated by steam, the rolls of which are smooth cylinders 3 inches in diameter and 8 inches in length, at 105° C. for 6 minutes after which the roll temperature was raised to 120° C. and the milling continued for 30 minutes. To determine the degree of substitution of the succinyl group on the cellulose acetate 25 g. of the photopolymerizable product prepared as described above was dissolved in 150 ml. ethylene glycol monomethyl ether. The cellulose acetate hydrogen succinate was precipitated by the addition of 200 ml. water. The precipitate was washed with four 200-ml. portions of water and dried to a constant weight in a drying oven at 105° C. One gram of the cellulose acetate hydrogen succinate thus purified was dissolved in 50 ml. ethylene glycol monomethyl ether and titrated with 0.1 N sodium hydroxide solution. The degree of succinyl substitution calculated for the weight of succinic anhydride added are indicated in Table 1.

*Table 1*

| Weight of succinic anhydride added (g.): | Degree of succinyl substitution |
|---|---|
| 23 | 0.66 |
| 35 | 0.80 |
| 46 | 0.84 |

The resulting sheets were formed into clear, transparent sheets 40 mils thick by pressing at 140° C. under a pressure of 300 pounds per square inch. The pressed sheet was laminated to a piece of steel 12 mils thick by means of a thermosetting adhesive in a laminating press for 3 minutes at 150° C. The resultant element was placed in a vacuum frame, and the polymer surface was brought into contact with a line process negative. The vacuum frame containing the plate and negative was placed beneath an 1,800-watt high-pressure mercury arc, and the plate exposed for 5 minutes. After exposure, the negative was stripped from the plate, and the unexposed polymer was removed by spray washing for 10 minutes using an 0.08 N aqueous solution of sodium hydroxide. A relief image firmly bonded to the steel and corresponding to the clear areas of the negative was obtained. The printing plate thus prepared showed excellent image quality and long press life when used for printing in a rotary press.

EXAMPLE II

The composition mixture containing 23 g. succinic anhydride and other ingredients described in Example I, except that 1 ml. pyridine replaced the diethylcyclohexylamine, was formed into a translucent sheet by milling on a rubber mill as described in Example I for 30 minutes at 120° C. The degree of succinyl substitution was determined by the method indicated in Example I, and was calculated as 0.26. Another catalyst was used in place of the diethylcyclohexylamine described in Example I and the pyridine described above, i.e., 1 ml. triethylamine. The composition, as indicated above containing the different amine, was mixed and milled as described in Example I. The degree of succinyl substitution was 0.44. These compositions, when used as described in Example I to make photopolymerizable elements, give similar printing reliefs.

EXAMPLE III

Fifty-seven grams cellulose acetate, 23 g. succinic anhydride, 40 g. triethylene glycol diacrylate containing the initiator and inhibitor described in Example I, and 1 ml. pyridine were mixed in the planetary mixer for 5 minutes. The resultant mixture was placed on the rolls of the rubber mill described in Example I, the rolls of which had been preheated to 120° C., and milled for periods of 20, 40 and 60 minutes in three separate experiments. The degree of succinyl substitutions were determined as described in Example I. The degree of succinyl substitution in each case fell within the 0.61–0.64 range. These compositions, when used as described in Example I to make photopolymerizable elements, give similar printing reliefs.

EXAMPLE IV

Fifty-seven grams of cellulose acetate and 35 grams of triethylene glycol diacrylate containing an initiator and inhibitor as described in Example I and 57 ml. of water were mixed in a planetary mixer for 5 minutes at room temperature. The mixture was placed on the rubber mill preheated at 105° C. and milled until the water was essentially evaporated, as shown by the readiness of the mixture to fall off the mill. (Completely dry mixtures were found to fall from the mill and were thus inconvenient to process.) Eight grams of succinic anhydride was added to the mixture on the mill and allowed to work into the mixture by milling for 10 minutes at 105° C., during which time further drying took place. Twenty-one grams of succinic anhydride and 2 ml. of diethylcyclohexylamine were combined and added to the mill and allowed to work into the mixture on the rubber mill by milling for 20 minutes at 105° C. At this point the polymer was removed from the rubber mill. From the material obtained a transparent sheet 40 mils thick was made by the pressing step described in Example I and the 40-mil sheet was laminated to a piece of steel 12 mils thick by the procedure described in Example I. The resultant element was exposed through a negative and the unexposed polymer removed as described in Example I. A 40-mil relief was obtained after a 6 minute washout. A clear, good relief image firmly bonded to the steel and corresponding to the clear areas of the negative was obtained.

EXAMPLE V

To 57 g. of the cellulose acetate described in Example I in the planetary mixer was added 23 g. maleic anhydride, 40 g. triethylene glycol diacrylate previously described, and 1 ml. diethylcyclohexylamine catalyst and the mixture mixed for 5 minutes. The resultant mixture was placed on a rubber mill the rolls of which had been preheated to 120° C. and milled for 30 minutes. To determine the degree of substitution of the maleyl group on the cellulose acetate 25 g. of the polymerizable product prepared as described above was dissolved in 150 ml. ethylene glycol monomethyl ether. The cellulose acetate hydrogen maleate was precipitated by the addition of 200 ml. of water. The precipitate was washed with four 200 ml. portions water and dried to a constant weight in a drying oven at 105° C. One gram of the cellulose acetate hydrogen maleate thus purified was dissolved in 50 ml. ethylene glycol monomethyl ether and titrated with 0.1 N sodium hydroxide solution. The degree of maleyl substitution was 0.22. Photopolymerizable elements were prepared as described in Example I and tested as indicated by exposure through a negative by actinic light followed by spray washing. Inspection indicated that a good, clear, well-bonded relief image was obtained.

EXAMPLE VI

The quantities of components were identical and the procedure indicated in Example V was followed except that 43 g. of phthalic anhydride replaced the 23 g. maleic anhydride. The degree of phthalyl substitution was determined by the method previously described in Example I and was analyzed as 0.45.

EXAMPLE VII

Six hundred (600) grams cellulose acetate, 462 g. propionic anhydride, 250 g. triethylene glycol diacrylate containing the initiator and inhibitor in the amounts described in Example I, and 10.5 mls. diethylcyclohexylamine catalyst were mixed for 5 minutes in the planetary mixer. The mixture obtained was milled on a preheated 10 inch by 20 inch rubber mill of the type described in Example I at 120° C. for 30 minutes. The degree of apparent acetyl was determined for both the cellulose acetate and the cellulose acetate propionate, the final product, by the method described in ASTM D 817–55T method A. The difference in apparent percent combined acetic acid was 4.2. This apparent increase was recalculated as a degree of propionyl substitution of 0.33. A printing element was prepared as described in Example I except that after exposure and removal of the negative the unexposed polymer was removed by washing with acetone. A relief image firmly bonded to the steel and corresponding to the clear areas of the negative was obtained.

EXAMPLE VIII

To 57 g. cellulose acetate in a planetary mixer there was added 29 g. succinic anhydride, 40 g. tetramethylene glycol diacrylate plasticizer (which contained the same amount of initiator, inhibitor and stabilizer as described in Example I) and 1 ml. diethylcyclohexylamine catalyst. The mixture was mixed as indicated in Example VII and milled on the preheated rubber mill at 120° C. for 20 minutes. The degree of succinyl substitution was analyzed as 0.70 by the method described in Example I.

EXAMPLE IX

Sixty two (62) grams of cellulose acetate (containing 8% volatiles), 35 g. of triethylene glycol diacrylate containing the initiator and inhibitor in the amounts described in Example I, and 52 ml. of water were mixed in a planetary mixer as described in Example IV. The mixture was placed on the rubber mill preheated at 105° C. and milled until the water was essentially evaporated. Ten (10) grams of succinic anhydride and 19 g. of succinic anhydride mixed with 1 g. of potassium acetate (esterification catalyst) were respectively added to the mixture on the mill as described in Example IV. The degree of succinyl substitution was determined by the method indicated in Example I, and was analyzed as 0.64. This composition, when used as described in Example I to make photopolymerizable elements, gave similar printing reliefs.

EXAMPLE X

Sixty (60) grams of cellulose acetate (containing 6% volatiles), 34 g. of triethylene glycol diacrylate containing the initiator and inhibitor in the amounts described in Example I, and 60 mls. of water were mixed in a planetary mixer as described in Example IV. The mixture was placed on the rubber mill preheated to 105° C. and milled until the water was almost completely evaporated. Twenty (20) grams of succinic anhydride and 9 g. of succinic anhydride with 1.55 g. of potassium carbonate (esterification catalyst) were respectively added to the mixture on the mill as described in Example IV. The final composition, when used as described in Example I to make photopolymerizable elements, gave similar printing reliefs.

EXAMPLE XI

Sixty (60) grams of cellulose acetate (containing 6% volatiles); 34 g. of diallyl itaconate containing 0.34 g. of benzoin, 0.3 g. p-methoxyphenol and 0.003 g. hydroquinone; and 60 mls. water were mixed in a planetary mixer as described as in Example IV. The mixture was placed on the rubber mill described in that example preheated to 105° C. and milled until the water was almost completely evaporated. Twenty (20) grams of succinic anhydride was added to the mixture on the mill and allowed to work into the mixture by milling for about 5 minutes at 105° C., during which time further drying took place. Nine (9) grams of succinic anhydride and 3 mls. diethylcyclohexylamine were added and allowed to work into the mixture by milling for 20 minutes at 105° C. The polymer was removed and used to make a photopolymerizable element as described in Example I. The element was exposed to actinic light as described in Example I for 25 minutes. The unexposed polymer was removed by spray washing for 7 minutes using an 0.08 N aqueous solution of NaOH. A relief image similar to that described in Example I was obtained.

EXAMPLE XII

Cellulose acetate (150 g.), as described in Example I, was slurried for 30 minutes in a bath at room temperature comprising 1800 mls. of water, 180 g. of triethylene glycol diacrylate (containing only the amount of polymerization inhibitor described in Example I), and 30 g. of potassium acetate. The impregnated cellulose ester was recovered by filtration and dried under vacuum to a moisture content of less than 0.3% by weight. One-tenth g. of anthraquinone, photoinitiator; 0.1 g. of mucochloric acid, stabilizing agent; 0.1 g. of additional p-methoxy phenol, polymerization inhibitor; and 60 g. of succinic anhydride were added to the dried cellulose acetate and the mixture milled on the rubber mill for 25 minutes at 130° C. The resultant product was formed into a printing element as described in Example I. A relief image firmly bonded to the base support and corresponding to the clear areas of the negative was obtained. When the printing plate was used for printing in a rotary press, results comparable to those described in Example I were obtained.

Preferred addition polymerization initiators activatable by actinic light and inactive thermally below 185° C. include those of the anthraquinone type disclosed in assignee's Notley Ser. No. 659,772, filed May 17, 1957. Suitable such initiators which can be used in procedures like those of the examples include 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alpha-sulfonic acid, 3-chloro-2-methylanthraquinone, retenequinone, 7,8,9,10-tetrahydronaphthacenequinone, and 1,2,3,4-tetrahydrobenz[*a*]anthracene-7,12-dione.

Cellulose acetate with a degree of acetyl substitution of 1.85 is one of the preferred reactants; the degree of acetyl substitution, however, may vary above or below that amount. In addition, other cellulose esters may be used, e.g., cellulose esters having free and esterifiable hydroxyl groups such as cellulose acetate propionate, cellulose acetate butyrate, cellulose propionate and cellulose butyrate.

The anhydrides of mono- and dicarboxylic acids may be used. Anhydrides of the monocarboxylic acids which give a satisfactory product may range from 2 to 18 carbons in length, 2–4 carbons being preferred. When the photopolymerizable material is prepared using monocarboxylic acid anhydrides, the unexposed portion of an element using such photopolymerizable material is removed by use of an organic solvent, i.e., acetone, the preferred solvent, or dioxane, ethylene glycol monoethyl ether or methyl ethyl ketone. The solvent may be applied in any conventional manner, as by pouring, immersion, spraying or brushing in removing unpolymerized portions of the composition. The dicarboxylic acid anhydrides which may be used in accordance with the invention include succinic and glutaric anhydride, i.e., those having 4 or 5 carbon atoms, succinic anhydride being the preferred compound. It is also possible to use anhydrides of aromatic dicarboxylic acids, e.g., phthalic anhyride. The unexposed portion of a photopolymerized element prepared using dicarboxylic acid anhydrides is readily removed, e.g., by impingement of spray jets or other washing procedures using a .02 to .08 N aqueous solution of sodium hydroxide at room temperature. Suitable ethylenically unsaturated compounds, in addition to the preferred compound, triethylene glycol diacrylate, include ethylene glycol diacrylate, diethylene glycol diacrylate, tetramethylene glycol diacrylate and diallyl itaconate. When a monocarboxylic acid anhydride is used, in addition to the above ethylenically unsaturated compounds, the following ethylenically unsaturated compounds may also be used, e.g., ethylene glycol dimethacrylate, diethylene glycol dimethacrylate, triethylene glycol dimethacrylate, and tetramethylene glycol dimethacrylate. Saturated plasticizers may also be present in the compositions along with the ethylenically unsaturated compounds, e.g., glyceryltriacetate (triacetin), glyceryltributyrate, triethylene glycol dipropionate, triphenyl phosphate, and dimethyl phthalate.

Catalyst can be added in an amount ranging from 0 to 20% by weight based on the dry reactants. To improve the speed of the esterification reaction, however, it is desirable that a catalyst be used. Tertiary organic amines are especially useful and diethylcyclohexylamine is the preferred compound but pyridine, triethylamine, trimethylamine acetate and pyridine acetate are also useful. In addition, several inorganic esterification catalysts may be used. These include: sodium carbonate, sodium phosphate, sodium borate, sodium acetate, calcium acetate, and magnesium acetate in addition to potassium acetate and potassium carbonate described in the examples.

Bloom (a white deposit) may appear on the unexposed element surface after prolonged storage. The deposit may be wiped off before the element is exposed, however, without interference with the utility of the product.

It has been found that white specks may occur in photopolymerized material and are detrimental because they affect the optical clarity of photopolymerizable printing plates made therefrom. To prevent the undesirable white specks, it is preferred that water, or other water-miscible swelling agent, be added to the cellulose derivative and ethylenically unsaturated compound during the preliminary mixing. The water acts as a swelling agent which allows greater homogeneity of the mixture. Examples of other swelling agents are methanol, ethanol and propanol.

The conditions of the process itself may vary. After the preliminary mixing at room temperature the mixture may be placed on a rubber mill and the admixture heated to a range of from 105 to 180° C. The mixture may be milled at these temperatures generally from 0.5 to 60 minutes. It should be pointed out, however, that at 180° C. if the product is milled for longer than 5 minutes it becomes charred and black. As the temperature is decreased the time of mixing may be increased. At 120° C. or possibly at a slightly higher temperature the mixture may be milled without any charring for at least 60 minutes. While it is preferred to use a rubber mill to heat and mix the product, other kneading devices and plastics extruders may also be used. Suitable such mixers or mills include sigma blade mixers, e.g., Werner-Pfleiderer and Banbury mixers-mills of all types including smooth and corrugated types.

As is apparent from the above, the procedural steps used in making the photopolymerizable compositions may vary. For instance, one can mix at room temperature (*a*) the cellulose ester (e.g., acetate) and (*b*) the ethylenically unsaturated monomer containing the initiator and thermal inhibitor and water in an amount from ½ to 12 or more times the weight of the cellulose acetate. The mixture can then be charged into a rubber mill and milled at the desired temperature, e.g., about 130° C. until the water content is reduced to about 3% by weight of the total composition. A portion of the dicarboxylic anhydride (about 50%) is added without the esterification catalyst and the mixture is milled at the same temperature for 5 to 15 minutes. The balance of the anhydride is added together with the esterification catalyst and the milling continued for 2 to 30 minutes.

In an alternative procedure, all of the anhydride can be added at one time and heating and milling at the desired temperature for 5 to 10 minutes. The esterification catalyst is added after the moisture content is less than 0.5%, and milling is continued at the desired temperature, e.g., 130° C. for 2 to 30 minutes.

In another alternative procedure there are admixed at room temperature (*a*) the cellulose ester (e.g., cellulose acetate), (*b*) the ethylenically unsaturated monomer containing the initiator and thermal inhibitor, (*c*) water in the amount ½ to 10 times the weight of said ester and (*d*) a portion of the final photopolymerizable mixture. The above mixture is added to a rubber mill and milled at the reaction temperature (e.g., 105° C.) until essentially all water is evaporated. The dicarboxylic acid anhydride and esterification catalyst are added while milling, and milling is continued for about 2 to 10 minutes.

In still another alternative procedure there are admixed at room temperature (*a*) the cellulose ester (e.g., acetate), (*b*) the ethylenically unsaturated monomer containing a polymerization inhibitor, (*c*) the esterification catalyst, and (*d*) water in an amount 10 to 12 or more times the weight of said ester. The above mixture is slurried for from about 30 to 60 minutes. The impregnated cellulose ester is recovered by filtration and the material dried until the water content is reduced to about 0.3% by weight of the total composition. Initiator, stabilizing agent, additional polymerization inhibitor, and dicarboxylic acid anhydride are added and the mixture milled at a temperature range of about 125 to 135° C. for about 20 to 30 minutes. In all procedures hereof, the initiator can be admixed prior to or after esterification is complete.

The product of the process of this invention may be used to prepare photosensitive, addition polymerizable polymeric compositions and the photopolymerizable elements made from such compositions.

The photopolymerizable compositions of this invention are also suitable for other purposes than in the production of printing reliefs in which readily insolubilized, solid, addition polymerizable compositions are useful, such as binders for television phosphors, in producing ornamental effects, and in plastic articles of various types.

The printing reliefs made in accordance with this invention can be used in all classes of printing but are most applicable to those classes of printing wherein a distinct difference of height between printing and nonprinting areas is required. These classes include those wherein the ink is carried by the raised portion of the relief such as in dry-offset printing, ordinary letterpress printing, the latter requiring greater height differences between printing and non-printing areas, and those wherein the ink is carried by the recessed portions of the relief such as intaglio printing, e.g., line and inverted halftone. The plates are obviously useful for multicolor printing.

This invention has an economic advantage over prior art procedures of making photopolymerizable compositions. By this invention process such a product is prepared in a two-step operation compared to the numerous steps where the cellulose ester is made separately and then admixed with the ingredients of a photopolymerizable composition. This process results in the saving of equipment, materials, and operating costs. The product is rapidly made (in less than one hour), no temporary solvent is used (i.e., no solvent must be removed before the product is suitable for use), and the recovery of solvents, etc., are essentially eliminated. Moreover, the final product does not have to be treated before it is recovered. In addition improved quality of the product is obtained due mainly to the reduction in the number of operational steps.

What is claimed is:

1. A process for making an addition polymerizable composition containing a cellulose mixed ester and simultaneously forming said ester which comprises admixing a cellulose partial ester of a saturated aliphatic monocarboxylic acid of 2 to 4 carbon atoms, a dicarboxylic acid anhydride, an addition polymerizable ethylenically unsaturated compound, an esterification catalyst, and heating the admixture to a temperature from 85° C. to 180° C. while maintaining the same for a period of 0.5 to 60 minutes whereby esterification of said partial ester occurs and admixing an addition polymerization initiator activatable by actinic light and having no significant thermal activity at the esterification temperature at any stage of the process including that at which esterification occurs and that subsequent to esterification.

2. A process as set forth in claim 1 wherein said catalyst is a tertiary amine.

3. A process as set forth in claim 1 wherein said anhydride is succinic anhydride.

4. A process as set forth in claim 1 wherein said unsaturated compound is triethylene glycol diacrylate.

5. A process as set forth in claim 1 wherein said initiator is thermally inactive below 185° C.

6. A process for making a photopolymerizable composition and simultaneously forming a cellulose mixed ester component thereof which comprises admixing (*a*) a cellulose partial ester of a saturated aliphatic monocarboxylic acid of 2 to 4 carbon atoms, (*b*) an addition polymerizable ethylenically unsaturated compound, an addition polymerization initiator activatable by actinic light and having no significant thermal activity at the esterification temperature, and a thermal addition polymerization inhibitor, (*c*) water in an amount from ½ to 10 times the weight of said cellulose ester, milling the admixture at a temperature from 100° C. to 160° C. until the water content is reduced to about 0.04 times the weight of said ester, (*d*) admixing a portion of a dicarboxylic acid anhydride and milling said mixture at said temperature for about 5 to 10 minutes, adding the remainder of said anhydride and (*e*) an esterification catalyst, and heating and milling the admixture for about 2 to 30 minutes, whereby the esterification is essentially complete.

7. A process as set forth in claim 6 wherein said ester is cellulose acetate and said anhydride is succinic anhydride.

8. A process for making a photopolymerizable composition and simultaneously forming a cellulose mixed ester component thereof which comprises admixing (*a*) a cellulose partial ester of a saturated aliphatic monocarboxylic acid of 2 to 4 carbon atoms, (*b*) an addition polymerizable ethylenically unsaturated compound, an addition polymerization initiator activatable by actinic light and having no significant thermal activity at the esterification temperature, and a thermal addition polymerization inhibitor, (*c*) water in an amount from ½ to 12 times the weight of said cellulose ester, milling the admixture at a temperature from 100° C. to 160° C. until the water content is reduced to about 0.04 times the weight of said ester, (*d*) admixing a dicarboxylic acid anhydride, milling said mixture at the aforesaid temperature for 5 to 10 minutes and (*e*) an esterification catalyst, and milling the admixture for about 2 to about 30 minutes.

9. A process as set forth in claim 8 wherein said cellulose ester is cellulose acetate and said anhydride is succinic anhydride.

10. A process for making a photopolymerizable composition and simultaneously forming a cellulose mixed ester component thereof which comprises admixing (*a*) a cellulose partial ester of a saturated aliphatic monocarboxylic acid of 2 to 4 carbon atoms, (*b*) an ethylenically unsaturated compound, an addition polymerization initiator activatable by actinic light and having no significant thermal activity at the esterification temperature, and a thermal addition polymerization inhibitor, (*c*) water in an amount from ½ to 10 times the weight of said cellulose ester, (*d*) a portion of the final photopolymerizable mixture, milling the admixture at a temperature from 100° C. to 160° C. until the water is essentially evaporated, and (*e*) admixing the dicarboxylic acid anhydride and an esterification catalyst, and milling the admixture for a period of about 2 to about 10 minutes.

11. A process as set forth in claim 10 wherein said ester is cellulose acetate and said anhydride is succinic anhydride.

12. A process for making an addition polymerizable composition containing a cellulose mixed ester and simultaneously forming said ester which comprises admixing (1) cellulose partial ester of a saturated aliphatic monocarboxylic acid of 2 to 4 carbon atoms, the sole ester groups present in said partial ester being of such an acid, (2) a dicarboxylic acid anhydride, (3) an addition polymerizable ethylenically unsaturated carboxylic acid diester containing two terminal ethylenic groups, and (4) an esterification catalyst, and heating the admixture to a temperature between 85° C. and 180° C. while maintaining said temperature for a period of 0.5 to 60 minutes whereby esterification of said partial ester occurs, and admixing an addition polymerization initiator activatable by actinic light and having no significant thermal activity at the esterification temperature at any stage of the process including that at which esterification occurs and that subsequent to esterification.

13. A process for making an addition polymerizable composition comprising a cellulose acetate succinate and simultaneously forming said ester which comprises admixing a cellulose partial acetic acid ester, succinic anhydride, an acrylic acid diester of a glycol taken from the group consisting of ethylene glycol, diethylene glycol and triethylene glycol, and an esterification catalyst, and heating the admixture to a temperature between 85° C. and 180° C. while maintaining said temperature for a period of 0.5 to 60 minutes whereby esterification of said partial ester occurs, and admixing an addition polymerization initiator activatable by actinic light and having no significant thermal activity at the esterification temperature at any stage of the process including that at which esterification occurs and that subsequent to esterification.

14. A process for making an addition polymerizable composition comprising a cellulose acetate succinate and simultaneously forming said ester which comprises admixing a cellulose partial acetic acid ester, succinic anhydride, a methacrylic acid diester of a glycol taken from the group consisting of ethylene glycol, diethylene glycol and triethylene glycol, and an esterification catalyst, and heating the admixture to a temperature between 85° C. and 180° C. while maintaining said temperature for a period of 0.5 to 60 minutes whereby esterification of said partial ester occurs, and admixing an addition polymerization initiator activatable by actinic light and having no significant thermal activity at the esterification temperature at any stage of the process including that at which esterification occurs and that subsequent to esterification.

References Cited in the file of this patent

UNITED STATES PATENTS 2,336,985 Freund ---------------- Dec. 14, 1943